C. L. DIXON.
BORING CUTTER.
APPLICATION FILED FEB. 7, 1917.
1,230,569.
Patented June 19, 1917.
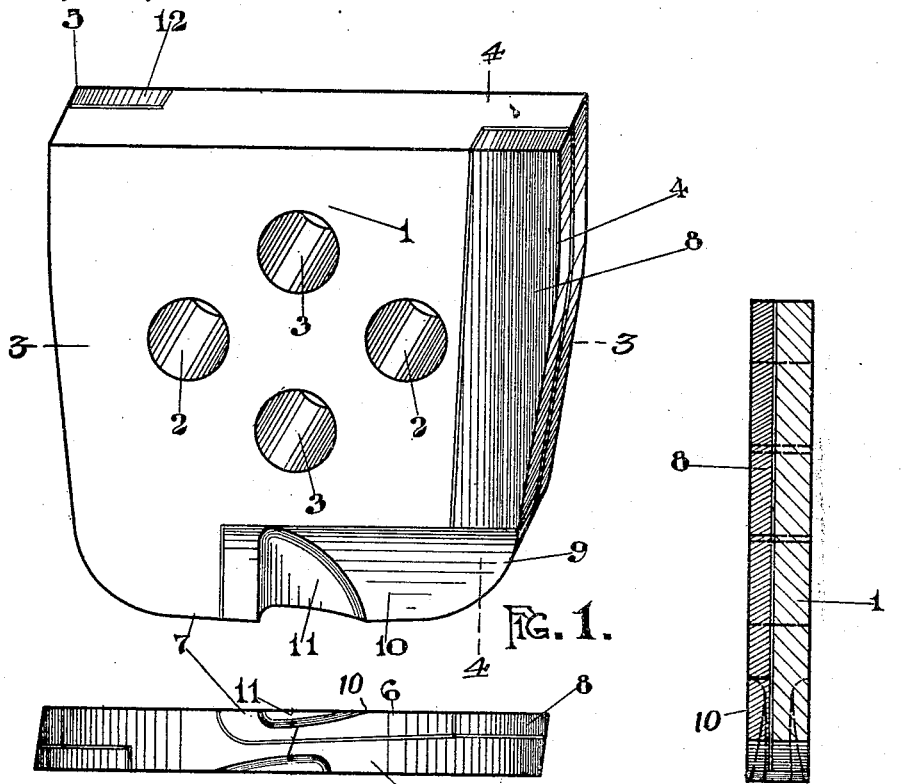
FIG. 1.
FIG. 4.
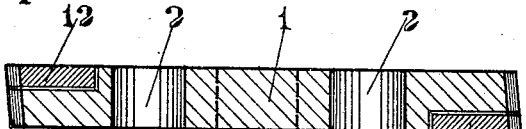
FIG. 2.
FIG. 3.
WITNESSES,
INVENTOR:
C. L. DIXON
BY,
ATTORNEY.

UNITED STATES PATENT OFFICE.

CUTHBERT LAVINGTON DIXON, OF MONTREAL, QUEBEC, CANADA.

BORING-CUTTER.

1,230,569.   Specification of Letters Patent.   Patented June 19, 1917.

Application filed February 7, 1917. Serial No. 147,140.

*To all whom it may concern:*

Be it known that I, CUTHBERT LAVINGTON DIXON, subject of the King of Great Britain, and resident of 278 Old Orchard avenue, in the city of Montreal, Province of Quebec, Dominion of Canada, have invented certain new and useful Improvements in Boring-Cutters, of which the following is the specification.

The invention relates to improvements in boring cutters as described in the present specification and illustrated in the accompanying drawings that form part of the same.

The invention consists essentially of the novel construction and arrangement of parts, whereby a great waste of expensive material is avoided by the attachment of cutter pieces of a high grade metal in a particular manner to a body of softer metal.

The objects of the invention are to effect economy in the manufacture of explosive shells, to devise a boring tool that will accurately bore into a piece of work, so that the center of the hole cannot be shifted during operations, to increase the factory output and generally to provide a tool that will be serviceable and durable.

In the drawings, Figure 1 is an isometric view showing the complete tool.

Fig. 2 is a plan view of the cutter end.

Fig. 3 is a cross sectional view on the line 3—3 in Fig. 1.

Fig. 4 is a vertical sectional view on the line 4—4 in Fig. 1.

Like numerals of reference indicate corresponding parts in each figure.

Referring to the drawings, the body 1 of the cutter is formed with the bolt holes 2 and 3 through which the bolts are inserted to secure it to the boring bar.

The cutters 8 and 12, secured in corresponding recesses in the body 1 in opposite sides, present the cutting edges 4 and 5 to the work and the cutter 10 extending along the greater portion of the end of the body from one side beyond the cutter 8 in a corresponding recess presents the cutting edges 6 and 7 to the work, the edge faces of the body sloping away to suit the shapes of the cutters and provide clearance. All of said cutters are welded to said body and present flush surfaces therewith and as before explained the cutter 8 terminates at the inside edge of the cutter 10, while the cutter 12 extends through to the cutting end of the tool.

A recess 11 is made in said cutter piece 10 in the shape of a scoop intermediate of the length of said piece and exactly central of the width of the cutter body 1, said recess extending to said body and corresponding to a similar recess in the opposite face of the cutter body 1, these recesses providing clearance in the operation of the cutters.

The pieces 8, 10 and 12 are as stated welded on to the body 1 and become identified with said body as one piece, though other methods may be used for securing said pieces so long as they are perfectly rigid with said body.

In boring operations, the roughing out of the shell is naturally done with the side cutters 8 and 12 and finished with the three cutters.

This method in boring is entirely dependent on this particular form of cutter, as by operating with the side cutters during the preliminary work there is no cutter point to shift while the actual bore is being made and consequently no tendency to "pocketing" a term well known in the making of shells.

Furthermore it will be seen that the body 1 being of a softer grade of metal than the high speed cutter pieces 8, 10 and 12, the heat generated by friction in the work of boring will be drawn by the softer metal from the cutter pieces and thus materially lengthen the life of said cutters.

These cutters can be made in all sizes and as they are welded to the bodies they can be arranged to suit the special work; in consequence various forms of cutters may be made and the actual construction varied without departing from the spirit of the invention so long as such changes remain within the scope of the claims for novelty following.

What I claim is:—

1. In a boring cutter, a body piece having cutter recesses formed at opposite sides and at the cutting end and cutters filling in said recesses and welded to form a whole piece with said body and having clearing recesses in the end portions.

2. In a boring cutter, a body and cutter pieces countersunk and welded to said body at opposite sides and extending outwardly to the end and a cutter piece countersunk and welded to said body in one face and extended across from a side cutter to a point beyond the center of said body.

3. In a device of the class described, a body having beveled sides and end and countersunk cutters beveled with said sides and end and welded to the body, the end cutter having a scoop shaped recess central of said body at the outer end and corresponding to a similar recess in the opposite face of said body, said end cutter continuing its cutting edge through and beyond said recess.

Signed at Montreal, Quebec, Canada, this 17th day of January, 1917.

CUTHBERT LAVINGTON DIXON.

Witnesses:
V. I. FETHERSTONHAUGH,
N. FETHERSTONHAUGH.

Copies of this patent may be obtained for five cents each, by addressing the "Commissioner of Patents, Washington, D. C."